United States Patent
Kang et al.

(10) Patent No.: US 9,606,286 B2
(45) Date of Patent: Mar. 28, 2017

(54) DISPLAY DEVICE

(71) Applicant: LG Display Co., Ltd., Seoul (KR)

(72) Inventors: Choun Sung Kang, Goyang-si (KR); Yong Ik Hwang, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 17 days.

(21) Appl. No.: 14/581,395

(22) Filed: Dec. 23, 2014

(65) Prior Publication Data

US 2015/0177451 A1    Jun. 25, 2015

(30) Foreign Application Priority Data

Dec. 23, 2013  (KR) ........................ 10-2013-0161345

(51) Int. Cl.
*F21V 8/00* (2006.01)
*G02F 1/1333* (2006.01)

(52) U.S. Cl.
CPC ..... *G02B 6/0088* (2013.01); *G02F 1/133308* (2013.01); *G02F 2001/133317* (2013.01); *G02F 2201/503* (2013.01); *G02F 2202/28* (2013.01)

(58) Field of Classification Search
CPC ............ G02B 6/0088; G02F 1/133308; G02F 2202/28; G02F 2201/503; G02F 2001/133317
USPC ........................................................ 362/606
See application file for complete search history.

(56) References Cited

U.S. PATENT DOCUMENTS

| | | | |
|---|---|---|---|
| 2009/0147174 A1* | 6/2009 | Ha ............... | G02F 1/133606 349/58 |
| 2012/0169961 A1* | 7/2012 | Ha ............... | G02F 1/1335 349/61 |
| 2013/0003352 A1* | 1/2013 | Lee .............. | G02B 6/0096 362/97.1 |
| 2014/0204310 A1* | 7/2014 | Lee .............. | G02F 1/133308 349/62 |

* cited by examiner

*Primary Examiner* — Ali Alavi
(74) *Attorney, Agent, or Firm* — Birch, Stewart, Kolasch & Birch, LLP

(57) ABSTRACT

A display device is discussed, which can include a display panel; a backlight unit providing light to the display panel; an optical member coupled to at least one of an upper surface and a lower surface of the display panel and extended to an outer direction of the display panel to surround an outside of the backlight unit or the display panel; and an elastic adhesive portion coupling the backlight unit with the optical member.

16 Claims, 4 Drawing Sheets

DISPLAY DEVICE

CROSS REFERENCE TO RELATED APPLICATIONS

This application claims the priority benefit of the Korean Patent Application No. 10-2013-0161345 filed on Dec. 23, 2013, which is hereby incorporated by reference for all purposes as if fully set forth herein.

BACKGROUND OF THE INVENTION

Field of the Invention
The present invention relates to a display device.
Discussion of the Related Art
FIG. 1 is a cross-sectional view of a liquid crystal display device 10 according to the related art. As shown, the liquid crystal display device 10 according to the related art includes a liquid crystal panel 11 and a backlight unit 12 providing light to the liquid crystal panel 11.

The backlight unit 12 includes a light source (not shown), a light guide plate 12a, a guide panel 12b supporting the liquid crystal panel 11, and a cover bottom 12c in which the light guide plate 12a and the light source are received.

Also, as shown, a foam pad 13 is coupled between the liquid crystal panel 11 and the guide panel 12b to couple the liquid crystal panel 11 with the guide panel 12b.

However, since the structure for supporting the liquid crystal panel 11 using a mechanism such as the guide panel 12b and at the same time coupling the backlight unit 12 with the liquid crystal panel 11 necessarily requires a non-active area, a problem occurs in realizing a narrow bezel.

SUMMARY OF THE INVENTION

Accordingly, the present invention is directed to a display device that substantially obviates one or more problems due to limitations and disadvantages of the related art.

An advantage of the present invention is to provide a display device in which a display panel is coupled with a backlight unit and at the same time is integrated with the backlight unit by using an optical member surrounding an outside of the backlight unit.

Another advantage of the present invention is to provide a display device that may absorb deformation of a display panel by using an elastic adhesive portion, which may be coupled with an optical member, to shield light leakage that may be generated at an outer region of the display panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to the present invention comprises a display panel; a backlight unit providing light to the display panel; an optical member coupled to at least one of an upper surface and a lower surface of the display panel and extended to an outer direction of the display panel to surround the outside of the backlight unit or the display panel; and an elastic adhesive portion coupling the backlight unit with the optical member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
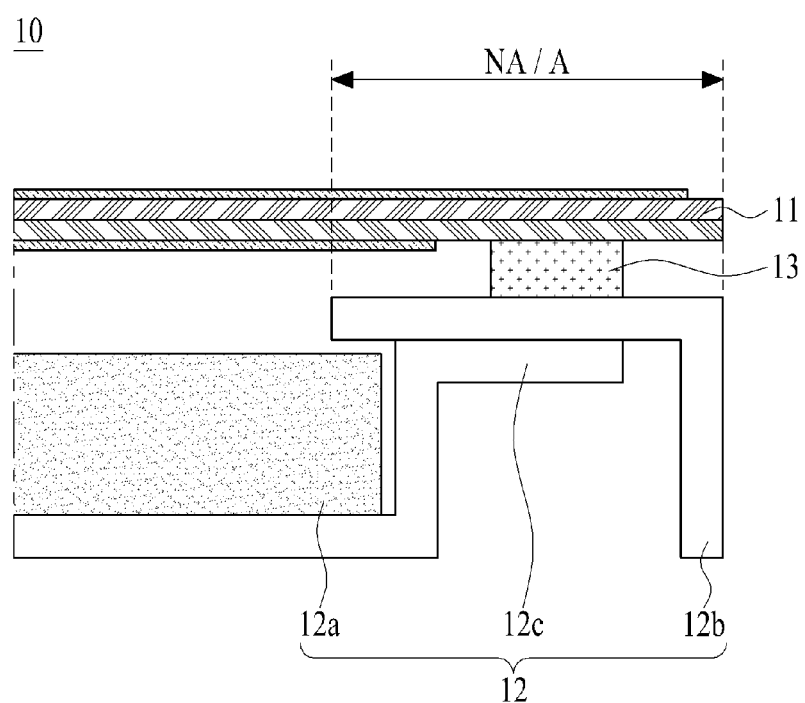
FIG. 1 is a cross-sectional view of a liquid crystal display device according to the related art.

Reference will now be made in detail to the exemplary embodiments of the present invention, examples of which are illustrated in the accompanying drawings. Objects, advantages and features of the present invention will be apparent from the following description and preferred embodiments associated with the accompanying drawings. In this specification, wherever possible, the same reference numbers will be used throughout the drawings to refer to the same or like parts. Also, although terminologies such as first and second may be used to describe various elements, the elements should not be limited to the terminologies. These terminologies are intended to identify one element from another element. In the following description of the present invention, if detailed description of elements or functions known in respect of the present invention is determined to make the subject matter of the present invention unnecessarily obscure, the detailed description will be omitted.

The display device according to the embodiments of the present invention can include a display panel, a backlight unit providing light to the display panel, an optical member coupled to at least one of an upper surface and a lower surface of the display panel and extended to an outer direction of the display panel to surround an outside of the backlight unit or the display panel, and an elastic adhesive portion coupling the backlight unit with the optical member.

Also, the backlight unit can include a backlight providing light to the display panel, and a receiving unit receiving the backlight.

Also, the receiving unit can include a lower case in which the backlight is received, and a cabinet including a sidewall coupled to an upper portion of the lower case and originated towards a display panel to surround an anti-light-entrance portion of the backlight, wherein the cabinet includes a coupling groove to which the elastic adhesive portion is coupled.

Also, the elastic adhesive portion can include a first elastic adhesive member coupled to one end of the cabinet facing the optical member, and a second elastic adhesive member coupled to the coupling groove, wherein the first and second elastic adhesive members are coupled with the optical member.

Also, the coupling groove can be formed on an outer circumference of the cabinet disposed in an anti-light-entrance direction.

Also, the coupling groove can be formed on a rear surface of the cabinet facing the optical member.

Also, the optical member can be coupled to the lower surface of the display panel and extended to the outer direction of the display panel to surround the outer side of the backlight unit.

Also, the optical member can be provided with a hollow hole at the center, and is coupled to a lower edge of the display panel to surround the outside of the backlight unit.

Also, the optical member can be coupled to the upper surface of the display panel and extended to the outer direction of the display panel to surround the outer side of the backlight unit and the display panel.

Also, the optical member can include a bending portion guiding a bending to surround the outer side of the backlight unit.

Also, the backlight can include a light source unit, a housing coupled to a rear direction of the cabinet, into which the light source unit is coupled, a light guide plate arranged in the receiving unit, including a light-entrance portion facing the light source unit, at least one optical sheet arranged on a light-emitting surface of the light guide plate, and a reflection sheet arranged in a rear direction of the light guide plate.

Also, the housing can include a horizontal portion supporting a lower portion of the cabinet, and a side portion extended from the horizontal portion towards the display panel, and the light source unit is coupled to an inner direction of the side portion.

Also, the housing can include a protrusion formed in an outer direction of the side portion.

Also, the backlight further can include a cover member covering an upper portion of the light source unit and an upper portion of the light-entrance portion of the light guide plate.

Also, the cover member can include an upper cover covering the upper portion of the light source unit and the upper portion of the light-entrance portion, and a side cover extended from the upper cover, having a hollow hole coupled with the protrusion of the housing.

Hereinafter, the preferred embodiments of the present invention will be described in detail with reference to the accompanying drawings.

Figure 2:
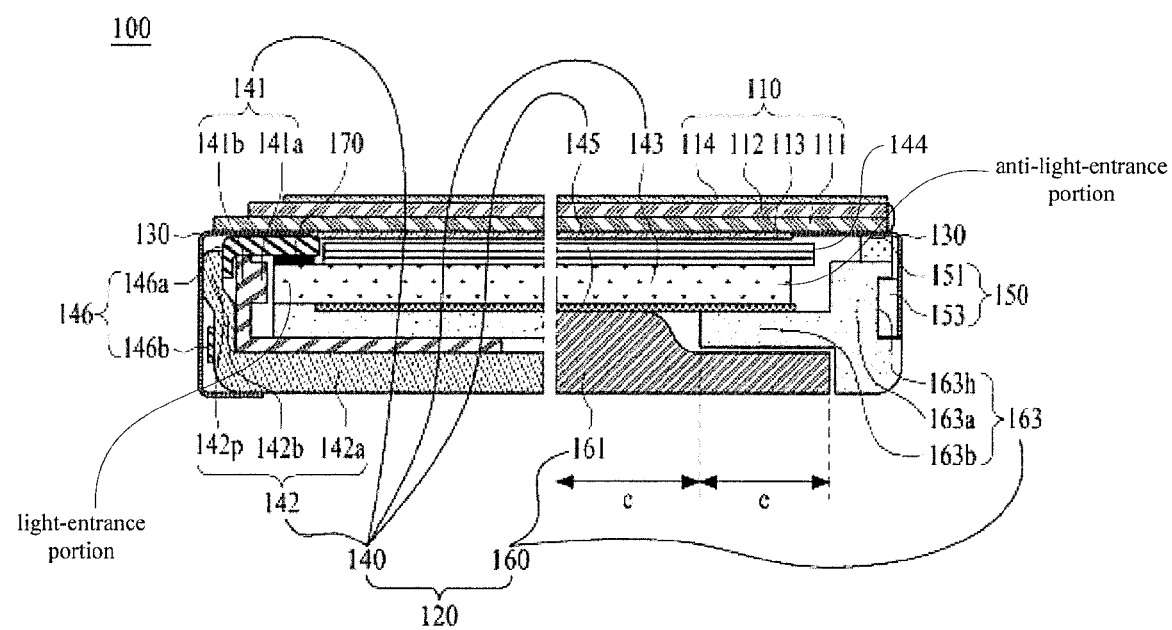
FIG. 2 is a cross-sectional view illustrating a display device with respect to a light-entrance direction in accordance with one embodiment of the present invention.
Figure 3:
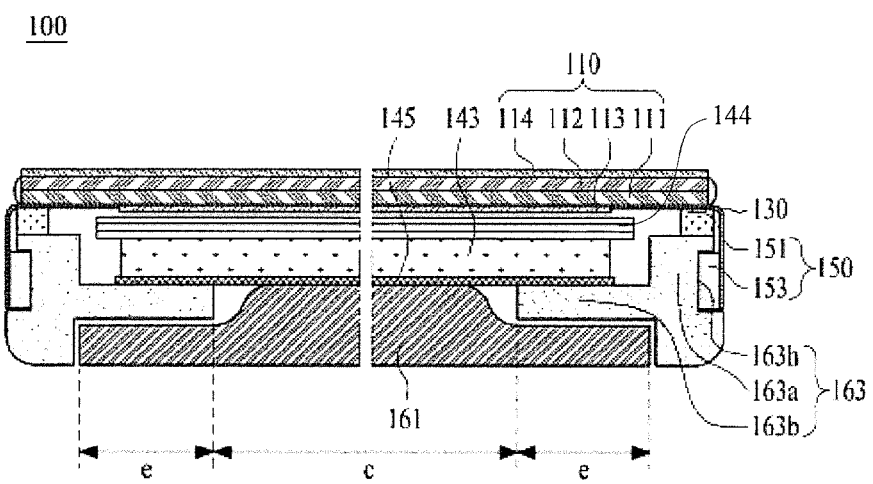
FIG. 3 is a cross-sectional view illustrating an anti-light-entrance direction of a display device shown in FIG. 2.
Figure 4:
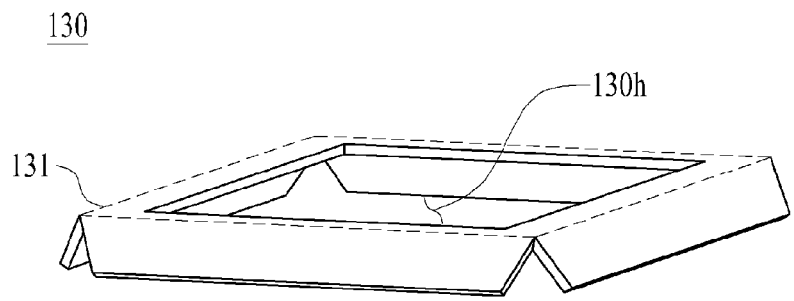
FIG. 4 is a perspective view illustrating an optical member according to an embodiment of the present invention.

FIG. 2 is a cross-sectional view illustrating a display device with respect to a light-entrance direction in accordance with one embodiment of the present invention, FIG. 3 is a cross-sectional view illustrating an anti-light-entrance direction of a display device shown in FIG. 2, and FIG. 4 is a perspective view illustrating an optical member according to the embodiment of the present invention.

Figure 5A:
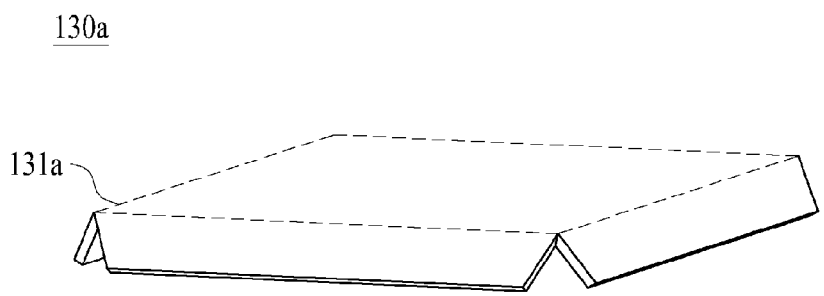
FIGS. 5A and 5B are perspective views illustrating various examples of an optical member according to an embodiment of the present invention.
Figure 5B:
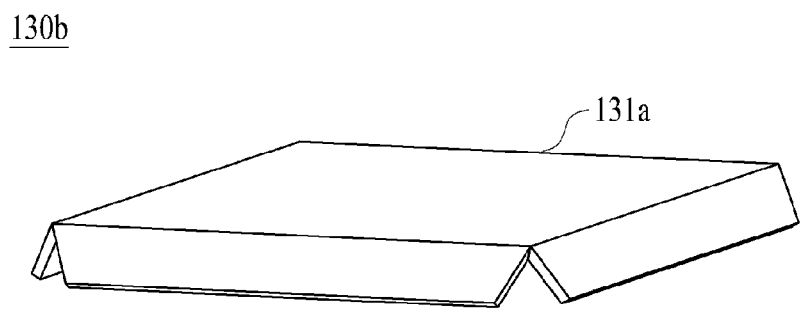

Further, FIGS. 5A and 5B are perspective views illustrating various embodiments of an optical member according to the embodiment of the present invention.

As shown, the display device 100 according to the embodiment of the present invention includes a display panel 110, a backlight unit 120, an optical member 130, and an elastic adhesive portion 150. The optical member 130 is coupled to at least one of an upper surface and a lower surface of the display panel 110 and extended to an outer direction of the display panel 110 to surround the outside of the backlight unit 120 or the display panel 110.

In more detail, the display panel 110 displays images by using light provided from the backlight unit 120 to allow a user to view the images, and may include a first substrate 111 on which a thin film transistor TFT may be formed, a first polarizing member 113 coupled to one side of the first substrate 111, a second substrate on which a color filter may be formed, and a second polarizing member 114 coupled to one side of the second substrate 112, wherein a liquid crystal layer may be coupled between the first substrate 111 and the second substrate 112.

As shown in FIGS. 2 and 3, the optical member 130 is coupled to the lower surface of the display panel 110 and extended to the outer direction of the display panel 110 to surround the outside of the backlight unit 120.

As a result, the display panel 110 and the backlight unit 120 may be integrated with each other and their slimming may be realized using the optical member 130, and a coupling force between the elements of the display device 100 may be improved.

Referring to FIGS. 2 and 3, the backlight unit 120 according to the embodiment of the present invention may include a backlight 140 providing light to the display panel 110, and a receiving unit 160 receiving the backlight 14 therein.

That is, the backlight 140 may include a light source unit 141, a housing 142, a light guide plate 143, an optical sheet 144, and a reflection sheet 145.

In more detail, the light source unit 141 may include a plurality of LEDs 141a and a printed circuit board 141b electrically connected with the LEDs 141a.

The housing 142 may be coupled to a rear direction of the cabinet 163, into which the light source unit 141 may be coupled.

In more detail, the housing 142 may include a horizontal portion 142a supporting the lower portion of the cabinet 163, and a side portion 142b extended from the horizontal portion 142a towards the display panel 110, and the light source unit 141 may be coupled to an inner direction of the side portion 142b.

Also, a protrusion 142p is formed in an outer direction of the side portion 142b. Referring to FIG. 2, the protrusion 142p may be formed in such a manner that the side portion 142b is partially bent, or may be formed separately in the outer direction of the side portion 142b.

Also, the light guide plate 143 includes a light-entrance portion facing the light source unit 141, that is, LEDs 141a, and is arranged in the receiving unit 160.

In more detail, referring to FIG. 2, some region of the light guide plate 143 in a light-entrance direction may be supported by the housing 142, and referring to FIG. 3, a region of the light guide plate 143 in an anti-light-entrance direction may be supported by the cabinet 163 and the lower case 161, which constitute the receiving portion 160.

The optical sheet 144 may include a plurality of sheet groups of condensing sheets or diffusion sheets, which are arranged on an upper surface of the light guide plate 143, that is, a light-emitting surface that provides light towards the display panel 110 to condense and diffuse the light provided from the light guide plate 143.

Also, the reflection sheet 145 may be arranged in a rear direction of the light guide plate 143 to reflect the light, which leaks from the light guide plate 143, into the light guide plate 143.

The backlight 140 according to the embodiment of the present invention may further include a cover member 146 that may cover the upper portion of the light source unit 141 and the upper portion of the light-entrance portion of the light guide plate 143.

In more detail, referring to FIG. 2, the cover member 146 may be made of a thin plate of metal material, and may include an upper cover 146a and a side cover 146b.

That is, the upper cover 146a covers the upper portion of the light source unit 141 and the upper portion of the light-entrance portion of the light guide plate 143, and may prevent the light provided form the light source unit 141 from leaking to the outside of the backlight unit 120.

The side cover 146b is coupled to the side portion 142b of the housing 142.

Also, a protective member 170 may be coupled between the upper cover 146a and the upper portion of the light-entrance portion of the light guide plate 143 to prevent the light guide plate 143 from being damaged by the upper cover 146a.

In more detail, the protective member 170 may be made of any one of foam pad, elastic resin, and optical clear adhesive (OCA).

Therefore, the housing 142 may fixedly be coupled with the cover member 146 through a projection structure based on the protrusion 142p of the housing 142 and the hollow hole 146h of the cover member 146.

Also, since the cover member 146 may naturally restrict movement of the light guide plate 143 through the projection structure between the housing 142 and the cover member 146, the light guide plate 143 may be prevented from being moved in the backlight unit 120 or being lifted in one direction.

Referring to FIGS. 2 and 3, the receiving unit 160 according to the embodiment of the present invention may include a lower case 161 and a cabinet 163.

In more detail, the lower case 161 may be made of a metal material, and may receive the light source unit 141, the housing 142, the light guide plate 143, the optical sheet 144 and the reflection sheet 145, which constitute the aforementioned backlight 140.

An edge area 'e' of the lower case 161 may be comprised of a round shaped step difference portion lower than a center area 'c' of the lower case 161 such that the cabinet 163 may be placed thereon.

As a result, even if the cabinet 163 is placed on the edge area 'e' of the lower case 161, the upper surface of the cabinet 163 and the upper surface of the lower case 161 are arranged on the same plane.

Also, the cabinet 163 may include a sidewall 163a originated towards the display panel 110 to surround the anti-light-entrance portion of the backlight 140, and a support surface 163b supporting the light guide plate 143.

In other words, referring to FIGS. 2 and 3, the cabinet 163 may be coupled to the upper portion of the lower case 161, that is, the edge area 'e' of the lower case 161 as described above.

In more detail, the cabinet 163 is made of a plastic material, and may have a rectangular frame shape that includes an opening to externally expose the other area except the edge area 'e' of the lower case 161.

Also, referring to FIGS. 2 and 3, it is preferable that the sidewall 163a of the cabinet 163 is formed in an anti-light-entrance direction.

The cabinet 163 may include a coupling groove 163h to which a random elastic adhesive member constituting the elastic adhesive portion 150, which will be described later, is coupled.

In more detail, as shown in FIGS. 2 and 3, the coupling groove 163h may be formed on the outer circumference of the cabinet 163 disposed in the anti-light-entrance direction.

Referring to FIGS. 2 and 3, the elastic adhesive portion 150 according to the embodiment of the present invention may include a plurality of elastic members for coupling the backlight unit 120 with the optical member 130.

In more detail, the elastic adhesive portion 150 includes a first elastic adhesive member 151 and a second elastic adhesive member 153, and may be made of any one of foam pad, elastic resin, and optical clear adhesive (OCA). Preferably, the elastic adhesive portion 150 is made of a foam pad material in accordance with the embodiment of the present invention.

In other words, the first elastic adhesive member 151 may be coupled to one end of the cabinet 163 facing the optical member 130, that is, the upper portion of the cabinet 163, thereby coupling the optical member 130 with the cabinet 163.

The second elastic adhesive member 153 may be coupled to the coupling groove 163h to couple the optical member 130 with an outer circumference direction of the cabinet 163.

Namely, if the display panel 110 is affected by an environment of high temperature or high humidity and thus is shrunk or expanded repeatedly, stress is generated in the display panel 110.

At this time, since the stress generated in the display panel 110 may be compensated by the first and second elastic adhesive members 151 and 153 of elastic materials, light leakage, which may be generated at the edge of the display device 100, may be avoided.

Also, referring to FIG. 4, the optical member 130 according to the embodiment of the present invention is provided with the hollow hole 130h at the center as shown in FIGS. 2 and 3, and may be coupled to the lower edge of the display panel 110.

The optical member 130 may be manufactured of an optical material having a specific color obtained by mixing various colored dyes, thereby increasing aesthetic appearance or preventing light leakage from being generated.

Also, an adhesive member such as foam pad may be arranged between the optical member 130 surrounding the light-entrance direction and the housing 142 to increase a coupling force.

Referring to FIG. 4, the optical member 130 may include a bending portion 131 that guides a bending to surround the outside of the backlight unit 120.

In more detail, the bending portion 131 may be made of grooves discontinuously arranged using a half cutting process based on a laser or press.

Also, referring to FIG. 5A, the optical member 130a includes a bending portion 131a and may not be provided with an opening therein, whereby the optical member 130a may be coupled to the lower surface of the display panel 110 to surround the outside of the backlight unit 120.

Referring to FIG. 5B, the bending portion 131a formed in the optical member 130b may be made of a groove formed in a straight line.

As a result, since the optical member 130 according to the embodiment of the present invention may couple the display panel 110 with the backlight unit 120 and at the same time surround the outside of the backlight unit 120, the display panel 110 and the backlight unit 120 may be integrated with each other and their slimming may be realized, and the coupling force between the elements of the display device 100 may be improved.

Figure 6:
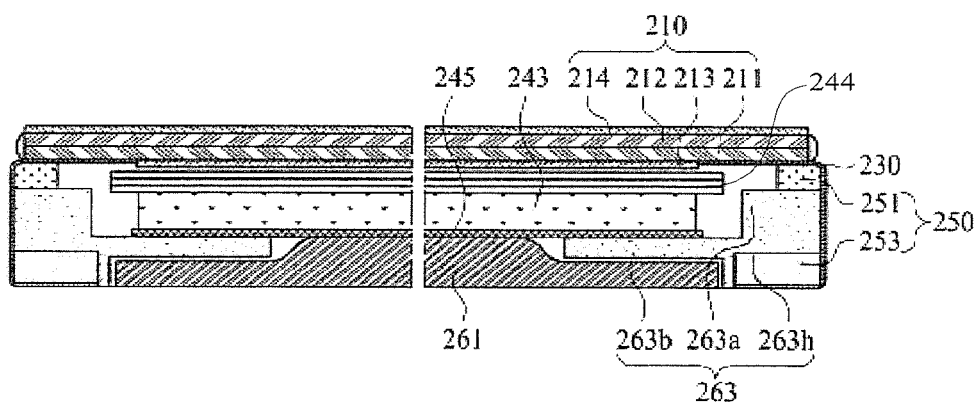
FIG. 6 is a cross-sectional view illustrating an anti-light-entrance direction of a display device according to another embodiment of the present invention.

FIG. 6 is a cross-sectional view illustrating an anti-light-entrance direction of a display device according to another embodiment of the present invention. In this embodiment, description of elements the same as or corresponding to those of the previous embodiment will be omitted. Hereinafter, the display device according to this embodiment will be described.

As shown, the display device 200 according to the embodiment of the present invention includes a display panel 210, a backlight unit, an optical member 230, and an elastic adhesive portion 250. The optical member 230 may be coupled to at least one of an upper surface and a lower surface of the display panel 210 and extended to an outer direction of the display panel 210, thereby surrounding the outside of the backlight unit or the display panel 210. The display panel 210 can include a first substrate 211 on which a thin film transistor TFT may be formed, a first polarizing member 213 coupled to one side of the first substrate 211, a second substrate 212 on which a color filter may be formed, and a second polarizing member 214 coupled to one side of the second substrate 212, wherein a liquid crystal layer may be coupled between the first substrate 211 and the second substrate 212.

In more detail, as shown in FIG. 6, the optical member 230 may be coupled to the lower surface of the display panel 210 and extended to the outer direction of the display panel 210, thereby surrounding the outside of the backlight unit.

As a result, by using the optical member 230 according to this embodiment, the display panel 210 and the backlight unit may be integrated with each other and their slimming may be realized, and the coupling force between the elements of the display device 200 may be improved.

The backlight unit may include a backlight providing light to the display panel 210, and a receiving unit receiving the backlight.

Also, the receiving unit may include a lower case 261 and a cabinet 263.

In more detail, an edge area 'e' of the lower case 261 may be comprised of a round shaped step difference portion lower than a center area 'c' of the lower case 261 such that the cabinet 263 may be placed thereon, in the same manner as the aforementioned lower case 161 of FIGS. 2 and 3.

The cabinet 263 may include a sidewall 263a originated towards the display panel 210 to surround an anti-light-entrance portion of the backlight, and a support surface 263b supporting the light guide plate 243.

That is, the backlight may include a light source unit, a housing, a light guide plate 243, an optical sheet 244, a reflection sheet 245, and a cover member in the same manner as the backlight 140 described with reference to FIG. 2.

Also, the elastic adhesive portion 250 may include a first elastic adhesive member 251 and a second elastic adhesive member 253.

In other words, the first elastic adhesive member 251 may be coupled to one end of the cabinet 263 facing the optical member 230, that is, the upper portion of the cabinet 263, thereby coupling the optical member 230 with the cabinet 263.

The second elastic adhesive member 253 may be coupled to a coupling groove 263h formed on a rear surface of the cabinet 263 to couple the optical member 230 with an outer circumference direction of the cabinet 263.

Also, the receiving unit may include a lower case 261 and the cabinet 263. The cabinet 263 may include a sidewall 263a coupled to the upper portion of the lower case 261 and originated towards the display panel 210 to surround the anti-light-entrance portion of the backlight unit.

The coupling groove 263h formed on the rear surface of the cabinet 263 may be coupled with the second elastic adhesive member 253.

In short, the formation position of the coupling grooves 163h and 263h to which the second elastic adhesive members 153 and 253 are coupled may freely be designed and modified within the cabinets 163 and 263 based on the display device 200 described with reference to FIG. 6 and the display device 100 described with reference to FIGS. 2 and 3.

Figure 7:
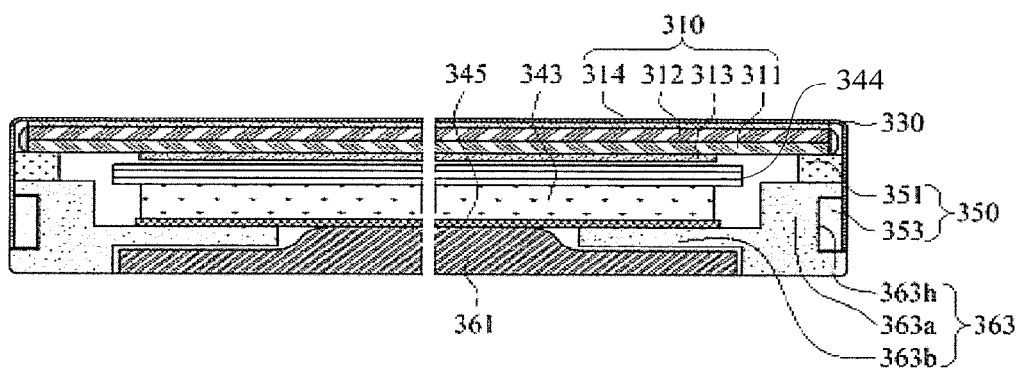
FIG. 7 is a cross-sectional view illustrating an anti-light-entrance direction of a display device according to other embodiment of the present invention.

FIG. 7 is a cross-sectional view illustrating an anti-light-entrance direction of a display device according to other embodiment of the present invention. In this embodiment, description of elements the same as or corresponding to those of the previous embodiment will be omitted. Hereinafter, the display device according to this embodiment will be described.

As shown, the display device 300 according to the embodiment of the present invention includes a display panel 310, a backlight unit, an optical member 330, and an elastic adhesive portion 350. The optical member 330 may be coupled to at least one of an upper surface and a lower surface of the display panel 310 and extended to an outer direction of the display panel 310, thereby surrounding the outside of the backlight unit or the display panel 310. The display panel can include a first substrate 311 on which a thin film transistor TFT may be formed, a first polarizing member 313 coupled to one side of the first substrate 311, a second substrate 312 on which a color filter may be formed, and a second polarizing member 314 coupled to one side of the second substrate 312, wherein a liquid crystal layer may be coupled between the first substrate 311 and the second substrate 312.

In more detail, as shown in FIG. 7, the optical member 330 may be coupled to the upper surface of the display panel 310 and extended to the outer direction of the display panel 310, thereby surrounding the outside of the display panel 310 and the outside of the backlight unit.

As a result, by using the optical member 330 according to this embodiment, the display panel 310 and the backlight unit may be integrated with each other and their slimming may be realized, and the coupling force between the elements of the display device 300 may be improved.

A backlight may include a light source unit, a housing, a light guide plate 343, an optical sheet 344, a reflection sheet 345, and a cover member in the same manner as the backlight 140 described with reference to FIG. 2. A cabinet 363 can include a sidewall 363a, a support surface 363b and a coupling groove 363h, identical to or similar to those of the cabinet 263.

Also, the elastic adhesive portion 350 may include a first elastic adhesive member 351 and a second elastic adhesive member 353.

According to one or more embodiments of the present invention, the following advantages may be obtained.

As the optical member according to the embodiments of the present invention is used to substitute for the guide panel of the related art, the thickness of the display device may be reduced and at the same time a narrow bezel may be realized.

Also, as the optical member is used, the display panel and the backlight unit may be integrated with each other, whereby the lightweight display device may be realized.

Furthermore, as the optical member is used, the display panel and the backlight unit may perfectly be adhered to each other, whereby slimming and coupling force of the display device may be improved.

Finally, as the elastic adhesive member according to the embodiments of the present invention is used, deformation of the display panel may be compensated, whereby light leakage may be prevented from being generated at the edge of the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a display panel;
    a backlight unit providing light to the display panel, the backlight unit including a cabinet having a sidewall and a support surface supporting a light guide plate;
    an optical member coupled to at least one of an upper surface and a lower surface of the display panel and extended to an outer direction of the display panel to surround an outside of the backlight unit or the display panel; and
    an elastic adhesive portion coupling the backlight unit with the optical member, wherein the elastic adhesive portion includes:
        a first elastic adhesive member directly in contact with a portion of the sidewall facing the display panel and the optical member; and
        a second elastic adhesive member directly in contact with a coupling groove of the sidewall not facing the display panel and the optical member.

2. The display device of claim 1, wherein the backlight unit includes:
    a backlight providing light to the display panel; and
    a receiving unit receiving the backlight.

3. The display device of claim 2, wherein the receiving unit includes:
    a lower case in which the backlight is received; and
    the cabinet including the coupling groove to which the second elastic adhesive member of the elastic adhesive portion is coupled.

4. The display device of claim 3, wherein the coupling groove is formed on a rear surface of the cabinet facing the optical member.

5. The display device of claim 3, wherein the coupling groove is formed on an outer circumference of the cabinet.

6. The display device of claim 2, wherein the backlight further includes:
    a light source unit;
    a housing coupled to a rear direction of the cabinet, into which the light source unit is coupled;
    the light guide plate arranged in the receiving unit, and including a light-entrance portion facing the light source unit;
    at least one optical sheet arranged on a light-emitting surface of the light guide plate; and
    a reflection sheet arranged in a rear direction of the light guide plate.

7. The display device of claim 6, wherein the housing includes:
    a horizontal portion supporting a lower portion of the cabinet; and
    a side portion extended from the horizontal portion towards the display panel, and
    the light source unit is coupled to an inner direction of the side portion.

8. The display device of claim 7, wherein the housing includes a protrusion formed in an outer direction of the side portion.

9. The display device of claim 8, wherein the backlight further includes a cover member covering an upper portion of the light source unit and an upper portion of the light-entrance portion of the light guide plate.

10. The display device of claim 9, wherein the cover member includes:
    an upper cover covering the upper portion of the light source unit and the upper portion of the light-entrance portion of the light guide plate; and
    a side cover coupled to a side portion of the housing.

11. The display device of claim 1, wherein the optical member is coupled to the lower surface of the display panel and extended to the outer direction of the display panel to surround the outer side of the backlight unit.

12. The display device of claim 11, wherein the optical member is provided with a hollow hole at the center, and is coupled to a lower edge of the display panel to surround the outside of the backlight unit.

13. The display device of claim 1, wherein the optical member is coupled to the upper surface of the display panel and extended to the outer direction of the display panel to surround the outer side of the backlight unit and the display panel.

14. The display device of claim 1, wherein the optical member includes a bending portion guiding a bending to surround the outer side of the backlight unit.

15. A display device comprising:
    a display panel;
    a backlight unit providing light to the display panel, wherein the backlight unit includes:
        a light source unit,
        a light guide plate arranged in a receiving unit and including a light-entrance portion facing the light source unit, the receiving unit receiving a backlight and including a cabinet having a sidewall and a support surface supporting the light guide plate,
        at least one optical sheet arranged on a light-emitting surface of the light guide plate, and
        a reflection sheet arranged in a rear direction of the light guide plate;
    an optical member coupled to at least one of an upper surface and a lower surface of the display panel and extended to an outer direction of the display panel to surround an outside of the backlight unit or the display panel; and
    an elastic adhesive portion coupling the backlight unit with the optical member, wherein the elastic adhesive portion includes:
        a first elastic adhesive member directly in contact with a front surface of the sidewall facing the display panel and the optical member; and
        a second elastic adhesive member directly in contact with a rear surface of the sidewall facing opposite to the display panel and the optical member.

16. The display device of claim 15, wherein the receiving unit includes a lower case in which the backlight is received, and wherein the cabinet includes a coupling groove to which the elastic adhesive portion is coupled.

* * * * *